(12) United States Patent
D'Antonio et al.

(10) Patent No.: US 6,634,279 B2
(45) Date of Patent: Oct. 21, 2003

(54) AIRLINE COFFEE BREWER

(75) Inventors: Nicholas F. D'Antonio, Tully, NY (US); Nicholas J. D'Antonio, Tully, NY (US); Ronald W. D'Antonio, Jamesville, NY (US)

(73) Assignee: D'Antonio Consultants International, Inc., East Syracuse, NY (US)

( * ) Notice: Subject to any disclaimer, the term of this patent is extended or adjusted under 35 U.S.C. 154(b) by 0 days.

(21) Appl. No.: 10/001,452

(22) Filed: Oct. 31, 2001

(65) Prior Publication Data

US 2002/0050209 A1 May 2, 2002

Related U.S. Application Data

(60) Provisional application No. 60/245,324, filed on Nov. 1, 2000.

(51) Int. Cl.⁷ .............................. A47J 31/00; G01F 23/28
(52) U.S. Cl. ........................ 99/285; 99/275; 99/323.3; 73/290 V
(58) Field of Search ..................... 99/285, 275, 279, 99/304, 306, 323.3; 73/290 V, 290 R, 570

(56) References Cited

U.S. PATENT DOCUMENTS 5,095,747 A * 3/1992 Smith ....................... 73/290 V
5,131,271 A * 7/1992 Haynes et al. ............. 73/290 V
5,158,793 A * 10/1992 Helbling .................... 99/283 X
5,880,364 A   3/1999 Dam

* cited by examiner

Primary Examiner—Reginald L. Alexander
(74) Attorney, Agent, or Firm—D. Peter Hochberg; Katherine R. Vieyra; Sean Mellino

(57) ABSTRACT

An ultrasonic system for measuring the volume of liquid in a container having a lid in which an ultrasonic signal is emitted and received by a sensor subsystem located on the underside of the lid of the ultrasonic system. The ultrasonic system can measure the exact amount of liquid or the level of the liquid held in the container by processing the roundtrip time the ultrasonic signals took to travel from the sensor subsystem to the surface of the liquid where the ultrasonic signals are reflected back to the ultrasonic sensor subsystem. A solid state, three-phase SCR/diode bridge converts a three-phase alternating current (AC) to a direct current (DC) power source for heating the liquid in a boiler subsystem prior to its transport to the container. A second, triac controlled heater is powered by a single phase of the three phase power source, and is used to warm and maintain the liquid held within the container at a constant temperature.

43 Claims, 8 Drawing Sheets

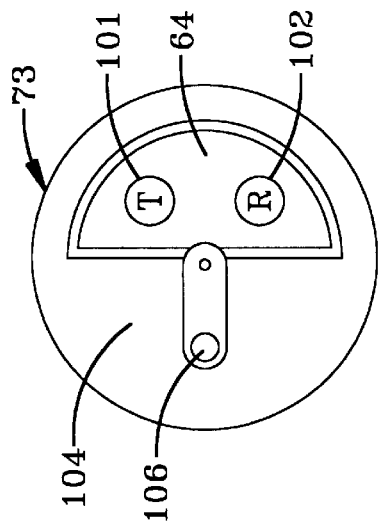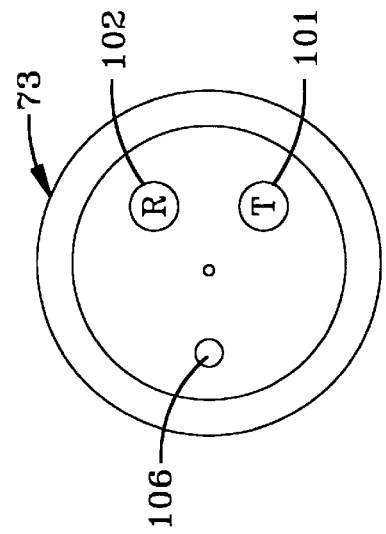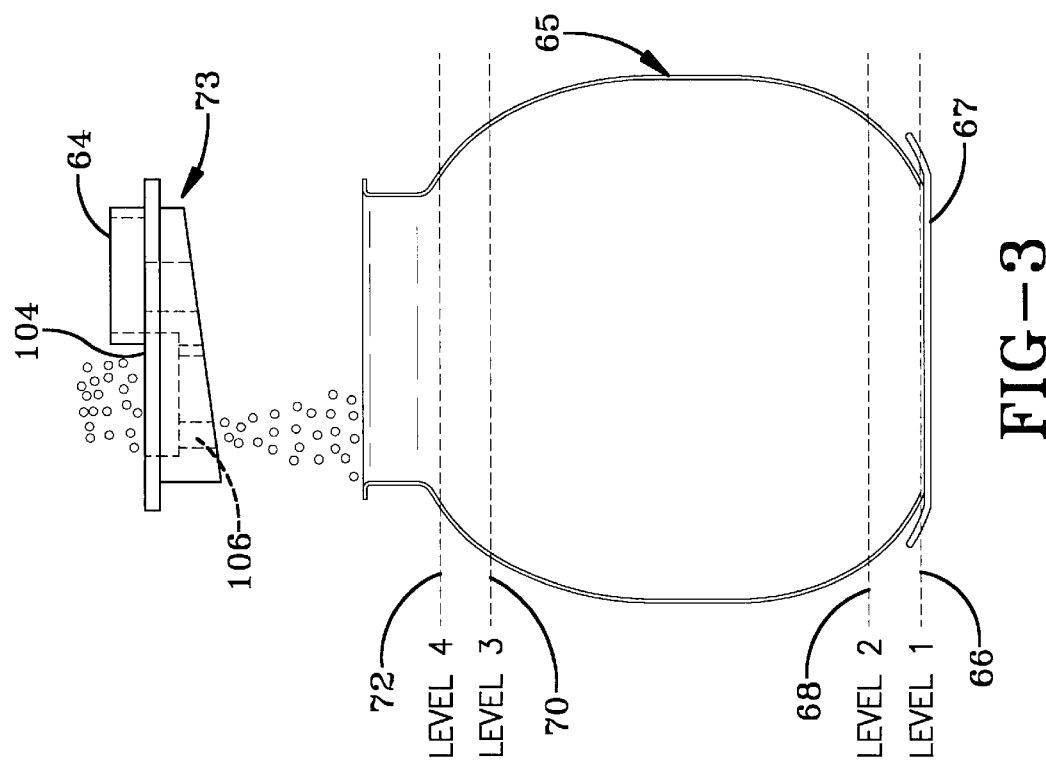

AIRLINE COFFEE BREWER

CROSS REFERENCE TO RELATED APPLICATION

This application claims priority of U.S. Provisional Application No. 60/245,324, filed Nov. 1, 2000, under Title 35, United States Code, Section 119(e).

FIELD OF THE INVENTION

The present invention relates generally to measuring systems for measuring the level of liquid held in a container. More specifically, the present invention relates to a measuring system that emits and receives ultrasonic signals and processes the ultrasonic signals to determine the level of liquid held in an underlying container and plays a major role in controlling operation of the system.

DESCRIPTION OF THE PRIOR ART

Devices for brewing coffee, especially while on board an aircraft, are well known in the industry. FIG. 1 is a block diagram portraying an airline coffee brewer typical in the prior art.

The prior art system includes a control board 10 that is normally constructed of discreet integrated circuits, input power from a 3-phase, 115 volt, 400 Hz aircraft power system 12, mechanical relay contacts 14, 16 and 18 that are actuated by coil 20 when coil 20 is energized with a signal 22 from control board 10. Mechanical relay contacts 14, 16 and 18 electrically isolate the low voltage control board 10 from the high voltage AC power lines supplying heating elements 24, 26 and 28. Heating elements 24, 26 and 28 are individually connected to the three phases of power system 12. A plurality of pot water level probes 30 are employed, in this example, as two free swinging metallic probes. Probes 30 come into contact with the water in the brewer when the carafe is full, as indicated at Level 4 and numeral 72 (FIG. 3). Probes 30 will momentarily swing out of the way when the carafe is inserted or removed from the brewer pocket. When probes 30 are in contact with the electrically conductive coffee in the carafe, a signal 32 occurs which will serve to close a cold-water input valve 34 that supplies cold water to boiler 39 which then heats it in preparation for brewing.

An additional probe, or sensor, 36 is located in boiler 39. Sensor 36, in conjunction with a processing circuit 37, that is external to boiler 39, will provide a control board input 38 when the boiler is filled with water. Sensor 36 and processing circuit 37 also serve to close relay contacts 14, 16 and 18 which provide power to heating elements 24, 26 and 28, which can be safely energized after the boiler is filled with water.

A temperature sensor 40 is also located in boiler 39. The external processing circuit 41 of temperature sensor 40 provides an input signal 42 to control board 10 when power to heating elements 24, 26 and 28 is needed in order to maintain a target temperature for the water.

One problem with the aforementioned prior art example is that the method for detecting a full carafe is subject to failure if sediment, carried by the water, forms on the sliding electrical surfaces of the probes 30. Another problem found in the prior art is that measuring intermediate levels of water in the container is either highly difficult, or not even possible. This will limit processor ability to determine other important performance characteristics of the brewer system. U.S. Pat. No. 5,880,364 (Dam) discloses a non-contact ultrasonic system for determining the volume of liquid in a container in which an ultrasonic sensor is disposed opposite the open top of the container. A circuit provides pulses of ultrasonic energy for transmission through the air to the air-liquid interface of liquid in the container and for measuring the round trip transit time from the sensor to the interface and back to the sensor. The system can determine the level of liquid in a plurality of containers using a plurality of sensors that are operated in sequence or simultaneously, or with a single sensor in which the plurality of sensors are moved relative to the single sensor for the volume of each of the sensors to be sequentially measured.

Regarding the '364 patent, the components are not compactly located in the lid assembly of a container. The system of the present invention seeks to improve upon this system by presenting the ultrasonic transducers and their signal processing function in a lid assembly, thus making the system more compact, cost efficient, and resistant to splashing in turbulent conditions when used in aircraft or moving vehicles.

Thus, there is an unsatisfied need to realize a less complex, more cost efficient coffee brewing system having a significant increase in system reliability.

SUMMARY OF THE INVENTION

The present invention is directed to a system for measuring liquid levels in a container by means of an ultrasonic signal. The present invention is further directed to a system having all of the ultrasonic components located in the lid of the system. This design creates a more compact, cost efficient, lightweight and reliable system.

According to the present invention, a narrow ultrasonic beam is emitted from an ultrasonic signal transmitting transducer and directed to an underlying liquid column. The ultrasonic beam is reflected upward at the liquid/air interface to be detected by an ultrasonic signal receiving transducer that interfaces with a signal processor on the system. By knowing the speed of sound in air, the system is able to determine the exact distance traveled by the ultrasonic signal. In turn, by knowing the dimensions of the container, the exact amount of liquid within the container can be determined, or the liquid level in the container regardless of its dimensions. The present invention is described herein in the context of being used on board an aircraft, however, the present invention can be adapted to be employed in any other environment such as in household use, or on board any other type or mode of transportation, such as a train or cruise liner.

In one embodiment of the present invention, the mechanical relay contacts in each of the three AC lines of the prior art are replaced with an electrically isolated, optically coupled triac for controlling heater power. In this embodiment, the present invention allows for a single heating element to be direct current driven from the rectified three phase, 400 Hz alternating current power that is typical of aircraft systems. This design improves reliability and cost effectiveness of the system over the prior art.

It is an object of the invention to provide a brewing system that eliminates a typical mode of power failure associated with the prior art.

It is another object of the present invention to provide a brewing system that is more cost efficient, more space efficient, more lightweight and more reliable than the prior art.

It is yet another object of the present invention to provide a brewing system having all of the components compactly located in the lid assembly for measuring liquid level in a container.

Still yet another object of the present invention is to provide a brewing system having a single design for delivering power to the heating elements of both AC and DC aircraft power systems with very little design change.

BRIEF DESCRIPTION OF THE DRAWINGS

FIG. 3 is a side view of the components used for measuring liquid level in the brewing system of the present invention.

FIG. 4 is a top view of the lid in the brewing system shown in FIG. 3.

FIG. 5 is a bottom view of the lid in the brewing system shown in FIG. 3.

DETAILED DESCRIPTION OF THE PREFERRED EMBODIMENTS

Figure 1A:
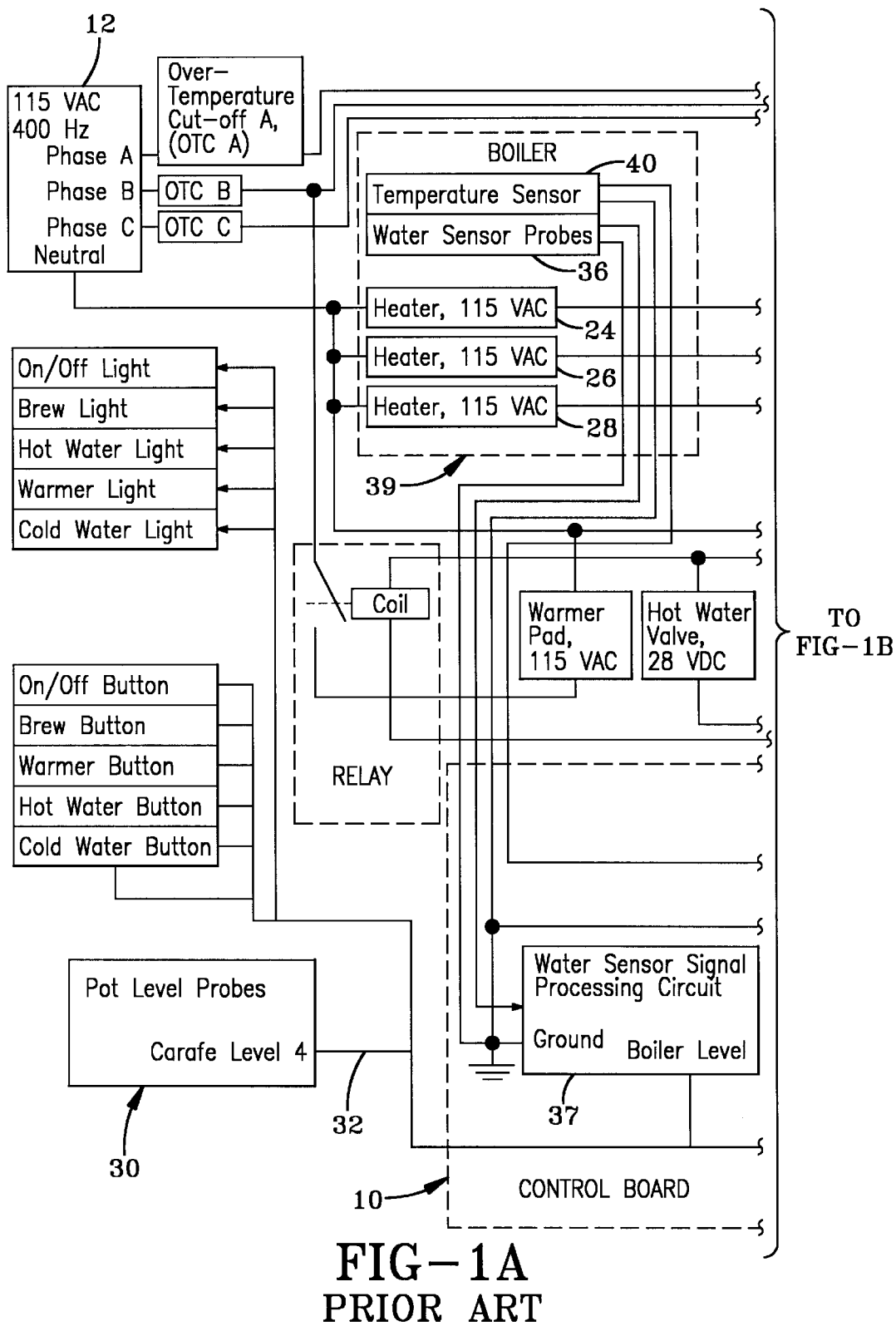
FIG. 1 is a block diagram for the circuitry of a typical airline brewer found in the prior art.

The present invention is now described with reference to the drawings, wherein like reference numerals are used to refer to like elements throughout. In the following description, and for purposes of explanation, numerous specific details are set forth in order to provide a thorough understanding of the present invention. It will be evident, however, to one skilled in the art that the present invention may be practiced without these specific details.

Figure 2A:
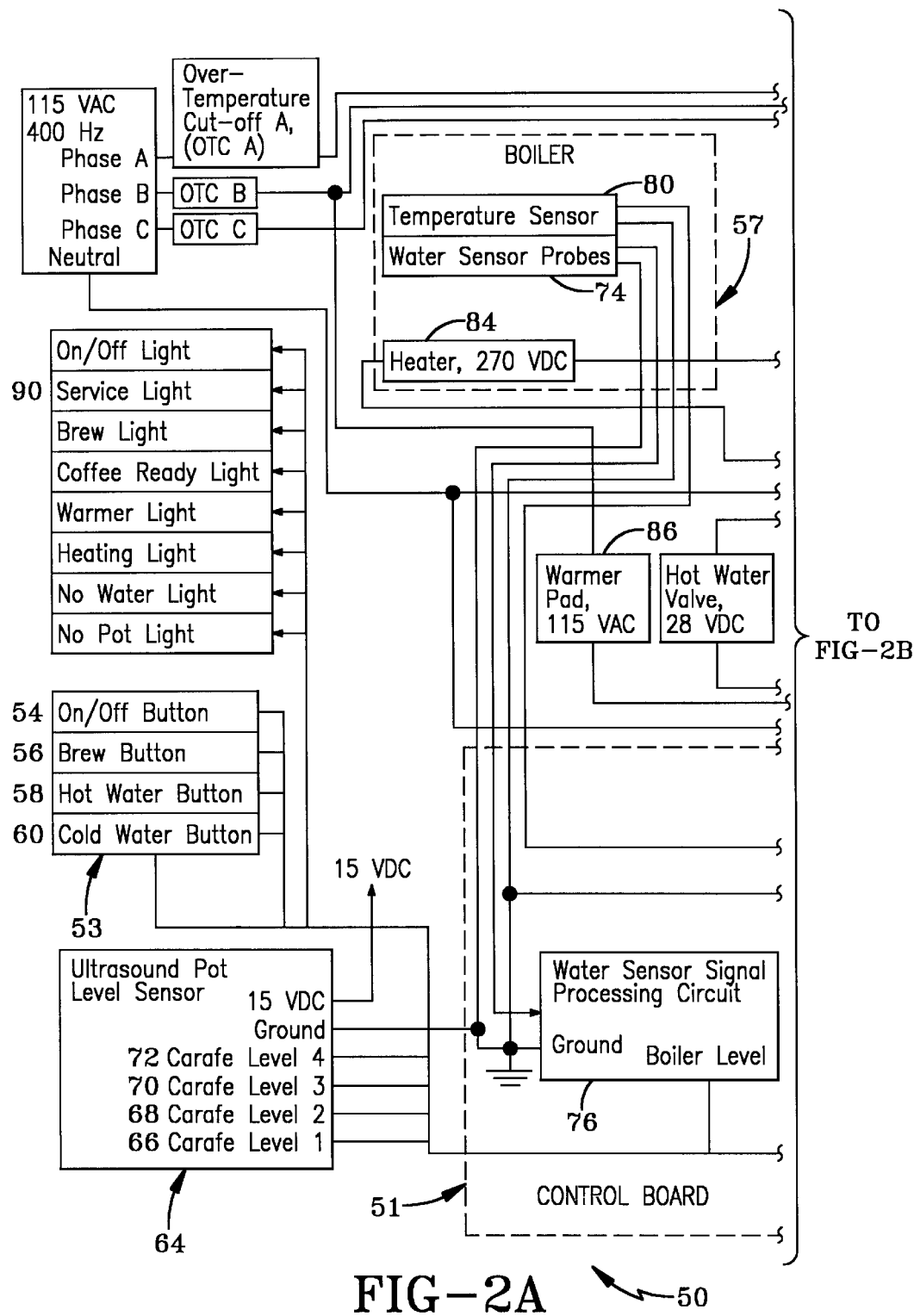
FIG. 2 is a block diagram for the circuitry of the brewing system of the present invention.
Figure 2B:
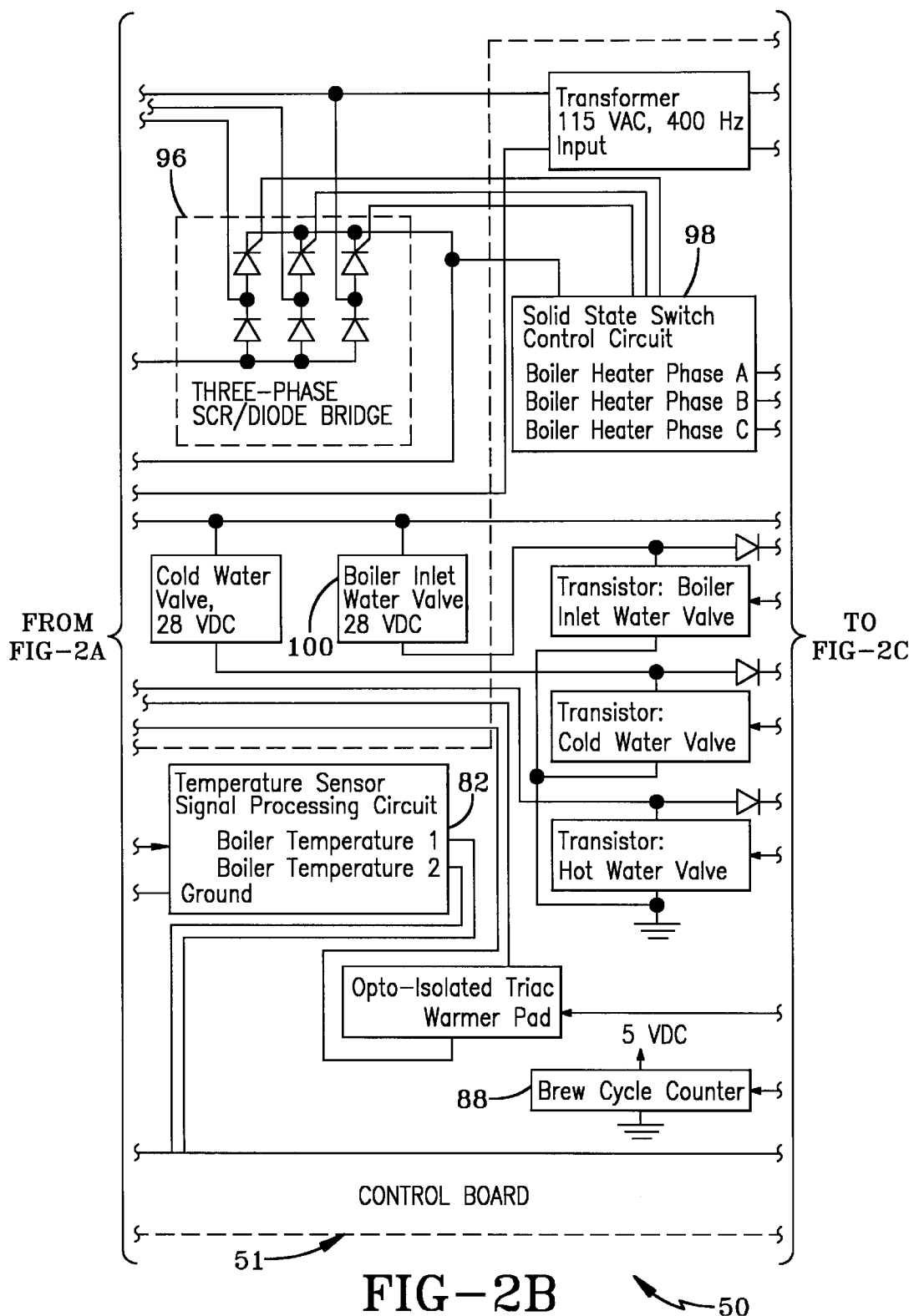
Figure 2C:
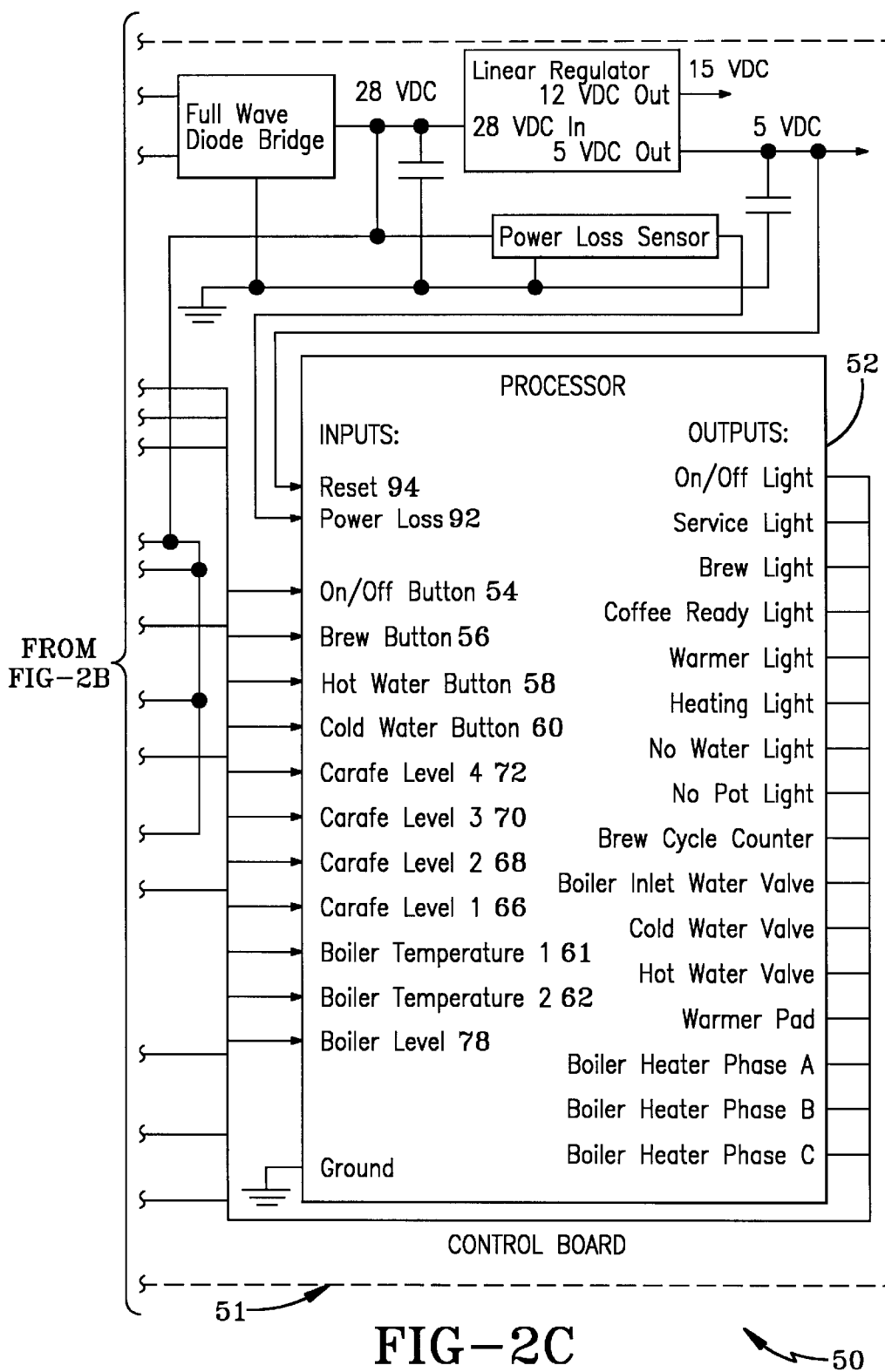

Referring now to FIG. 2, a block diagram of the system of the present invention is shown and referred to generally as numeral 50. It has been found that the numerous operational checks, control system functions and visual signals for a modern aircraft brewer are best served with a far more compact design than that found in the prior art. It is also noted that although system 50 of the present invention is explained in terms of being used on board an aircraft, it is within the scope of the present invention for system 50 to be applied to a brewer used in any other environment, such as household use, on board a passenger train, a commercial train or on board a nautical vessel.

System 50 includes a control board 51, a control board processor 52, and a user-input accessible keyboard 53. Control board processor 52 is implemented with a software controlled Field Programmable Gate Array (FPGA) or a microprocessor, or any other programmable device that will be accessible to changes that occur for different models, locations, installation techniques or modifications to the operation of system 50. For the case where such operational changes or variations are unlikely, and where the number of systems 50 produced will justify the production cost, the lower manufactured price for an Application Specific Integrated Circuit (ASIC) is a viable option. System 50 further includes a boiler 57 (FIG. 2A) for heating the water to a target temperature at about just below the water boiling temperature prior to having it pass through a compartment containing the coffee granules. After the coffee is brewed, it will then go to a depression 104 (FIG. 3) in lid 73 before passing through access hole 106 and into a carafe 65 (FIG. 3).

Control board processor 52 provides system 50 with the ability to monitor a variety of variables involved with operation of system 50. Processor 52 processes information and controls the reset of system 50 via system reset controller 94, system power loss via a power loss monitor 92, the turning on and off of system 50 via an on/off controller, which can be a button 54, the coffee brewing cycle via a brew cycle button 56, hot water via a hot water tap valve controller 58, cold water via a cold water tap valve controller 60, carafe levels 66, 68, 70, and 72, and determines low water temperature in boiler 57 via a water temperature sensor 80 and its processor 82, whose input on the controller board 52 is located at 61. High water temperature in boiler 57 is detected with the same temperature sensor and processor and is input to the controller board at location 62. User inputs to control board 51 of system 50 are provided by keyboard 53 located on the front panel of system 50. Keyboard 53 includes a system on/off controller, which can be a button 54, a coffee-brew cycle button 56 which begins the brew cycle when all of the required conditions have been received by processor 52, hot water tap valve controller 58 which provides un-brewed hot water to an outlet tap, and cold water tap valve button 60 which does the same for unheated water. The brew cycle of system 50 will automatically pause when processor 52 determines that the water temperature in boiler 57 either reaches or falls below a predetermined low temperature threshold as measured by boiler water temperature sensor 80 and its temperature sensor processor 82. Alternatively, the brew cycle will cease power to heater 84 when the water temperature in boiler 57 either reaches or exceeds an upper predetermined temperature as measured by boiler water temperature sensor 80.

The brew cycle of system 50 will also end when carafe 65 (FIG. 3) is full, shown at level 72 (FIG. 3), also referred to as Level 4. The brew cycle will pause and/or issue a malfunction alert if the time needed to fill carafe 65 reaches or exceeds a programmable time limit.

System 50 further includes an ultrasonic water level sensor subsystem 64, shown in both FIGS. 2 and 3. Subsystem 64 serves to first transmit, and then receive sound signals after they bounce off of the horizontal surface. The sound signals are processed by calculating the round-trip time of the sound pulse. The longest roundtrip time will occur when carafe 65 is either empty, or out of the brewer pocket, wherein, the pocket signal represents a first water level 66 that is needed to enable the brew cycle. Subsystem 64 also performs the same function upon water levels 68, 70 and 72 (FIG. 3) in carafe 65 during the brewing cycle. As pointed out above, the ultrasonic technique of sensor subsystem 64 relies on the round trip time for a transmitted sound pulse to reach a target and then bounce back to the ultrasonic receiver. The actual process of employing ultrasonic sound signals to determine the amount of liquid in a container is known in the art and an example of a technical description for this technique is given in U.S. Pat. No. 5,880,364. However, in U.S. Pat. No. 5,880,364, the components are not compactly located in the lid of the assembly of a container as described in this application.

An ultrasonic pulse transmitter shown as 101 on FIGS. 4 and 5 is located on sensor subsystem 64, and when properly driven, transmits a very short ultrasonic pulse. The effective length chosen for the ultrasonic pulse is substantially shorter than the shortest roundtrip time anticipated, and the choice is also influenced by the resonant frequency of the device. For example, a pulse of 1.0 Milliseconds is long enough for a 40 KHz device. For devices having higher resonant frequencies and the associated shorter wavelengths, correspondingly shorter pulses are acceptable. Devices are effectively assembled with frequencies in the range of 25 KHz to 2 MHz. Generally speaking, as resonant frequencies of the ultrasonic transducers get higher, the devices get smaller, resolution increases and settling times following a drive pulse are shorter, thus allowing for bounce measurements at closer distances. By the same token, higher frequency devices are more difficult to assemble, causing them to be more expensive as well.

Transmitter 101 is adapted to transmit a narrow ultrasonic beam through the air to then be reflected at the surface of the underlying column of liquid in carafe 65. Transmitter 101 has a generally cylindrical body of any suitable material compatible with the environment under which the measuring process is being performed. Subsystem 64 provides an electrical lead (not shown) to transmitter 101 and also has all of the necessary output wires to supply operating signals to control board 51. Transmitter 101 and processor 64 are of any dimensions suitable for fitting in the space provided by lid 73 for the application at hand. Lid 73 may preferably be made of any suitable material, such as a soft rubber, malleable rubber, plastic, or any other material suitable for deadening structure vibration in lid 73 and the resulting interference, thereby reducing the likelihood of cross-talk between transducers if multiple transducers are employed. The leading edge of an ultrasonic pulse transmission begins the time measurement by processor subsystem 64. The time measurement is completed upon detection of the return signal by receiving sensor 102 in subsystem 64. Knowing that the speed of sound in air is approximately 332 m/s at zero degrees centigrade, along with its correction for ambient temperature, will allow for a calculation by sensor subsystem 64 of the distance traveled by the ultrasonic signals. The ability of sensor subsystem 64 to detect the distance traveled by the ultrasonic signals allows sensor subsystem 64 to determine the presence of carafe 65 in brewer pocket 67 as well as the water level in carafe 65 at any moment during the brewing cycle. Furthermore, determining the water level in carafe 65 allows a user to know the amount of servings that remain in carafe 65 at any given time.

It is noted that the selection of ultrasonic transducers for applications where steam is typically present in the measurement area should be carefully performed. This is especially true for a subsystem 64 where condensed steam will deposit water droplets on the surfaces of lid 73 that house the transducers. For example, a subsystem having two-transducers could have droplets that cause a short circuit of the sound waves from transmitter to receiver if the design of lid 73, and its transducer elements, is not properly considered.

In another embodiment of the present invention, it is shown that the best solution for a steamy environment resides in system 50 having the same transducer to both emit and receive the ultrasonic signal in subsystem 64. However, even in this embodiment, transducer vibration after the transmission pulse is terminated will only settle quickly enough when using the small physical size and low mass associated with high frequency, more expensive devices.

Having explained the various functions and their purpose in system 50, a more concise explanation for a typical brew cycle sequence follows. Assuming that electrical power is available to system 50, and that system on/off button 54 has been actuated, boiler water sensor 74, along with water sensor signal processing circuit (or boiler processor) 76 will detect the presence of water in boiler 57. Upon detection of a sufficient amount of water in boiler 57, processor 76 provides a first enabling signal 78 as required to begin a new brew cycle. A second boiler sensor 80, also located in boiler 57, will detect the temperature of water in the boiler at any given time. If boiler water temperature is below an upper limit threshold, temperature processor 82 will provide a second, or heater enabling signal to control board 52. The presence of a carafe in the brewer pocket is detected by water level subsystem 64 to provide a third enabling signal 66 to controller 52. Finally, if brew button 56 is depressed, and all other enabling signals are present, SCR/Diode 3 phase rectifying bridge 96 is activated to send electrical power to a single heating element 84, thus beginning the heating cycle for the water in boiler 57. The water is heated to a point just below its boiling point, taking into account the expected cabin pressures.

System 50 also includes a warmer pad 86, located in base 67 of the brewer pocket (FIG. 3). Warming pad 86 is a low power device compared to boiler heater 84, and because of this, is typically connected to a single phase of the three-phase aircraft power system without the risk of an electrical unbalance in the system. Consequently, warming pad 86 is conveniently controlled by a semiconductor triac which is able to conduct both the positive and negative regions of the AC wave when triggered to the ON state. Upon the detection of a sufficient amount of water in carafe 65 as indicated by level 66 in FIG. 3, warming pad 86 will turn on and provide heat to the coffee collected in carafe 65. Warmer pad 86 is employed to maintain a constant temperature once the brewing cycle has started, thus maintaining the brewed coffee in carafe 65 at the same constant temperature both during and after the brew cycle is completed.

System 50 further includes a brew counter/maintenance indicator 88. Maintenance indicator 88 includes a memory feature so that the user may create a predetermined maintenance schedule for system 50. Maintenance indicator 88 serves to notify the user once the predetermined maintenance time, or number of brew cycles has arrived. The brewing status is displayed throughout the life of the brewer. Maintenance indicator 88 includes a service light 90. Maintenance indicator 88 will also monitor and display via service light 90 any time-out errors that occur. Therein, service light 90 will also indicate the need for a maintenance correction on system 50.

If input AC power is lost for any reason during the course of a brew cycle, a power loss controller 92 will cause control board 51 to save the status of the current brew cycle for a pre-selected period of time. One example of such power disruption occurs when an aircraft is being started. Once power returns within the pre-selected time, brewer status is restored. However, if power does not return within the preselected time, the brew cycle status is lost and a restart must be initiated by the user.

Figure 1B:
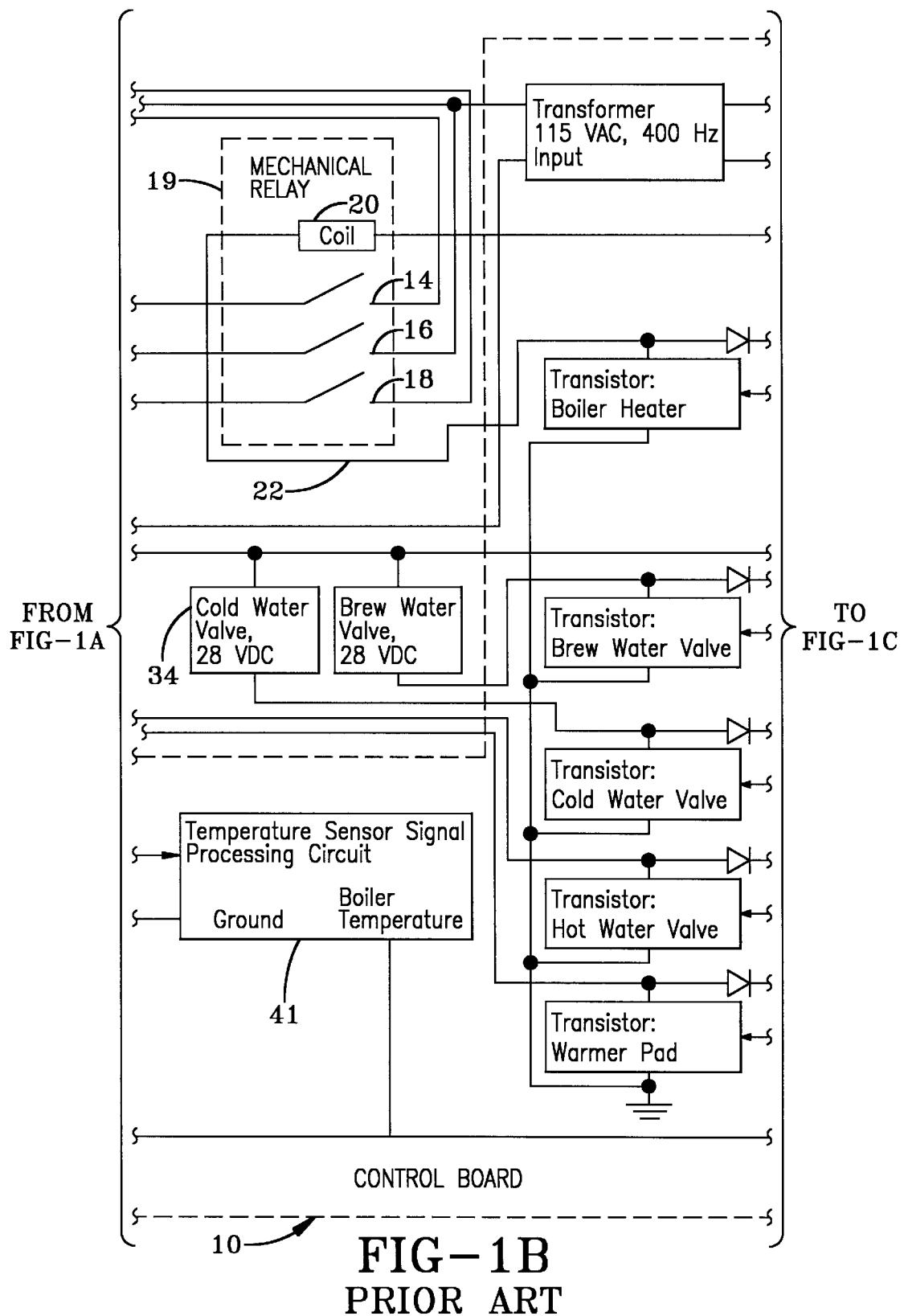
Figure 1C:
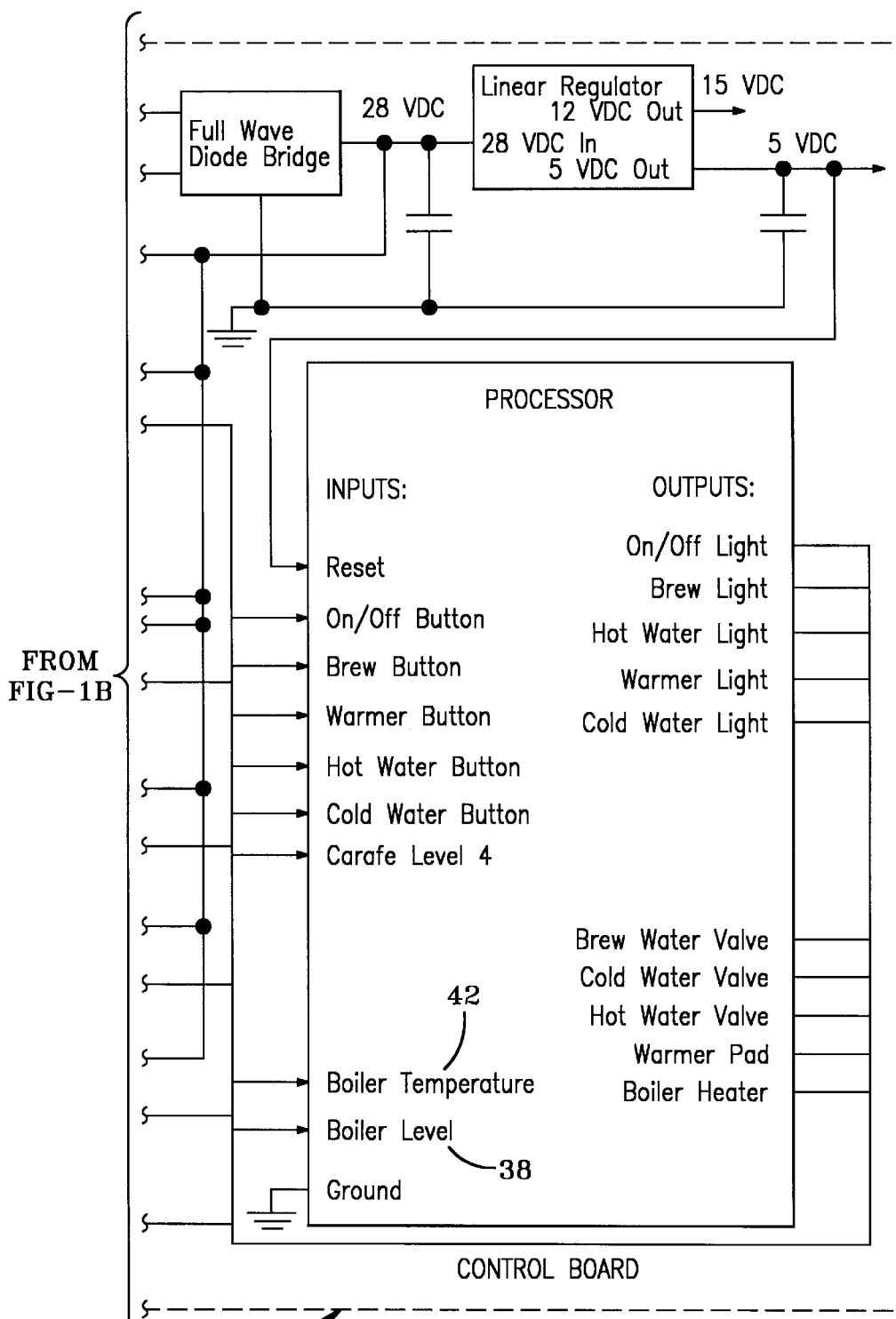

As stated earlier, boiler 57 in the present invention contains a single DC heating element 84. This technique is designed to save cost, space, and weight for system 50, an especially useful factor in aircraft applications. The method for controlling heating power via single heating element 84 includes an on/off controllable switch, solid state, three phase SCR/diode bridge 96. Bridge 96 converts the three-phase, 400 Hz AC aircraft power to DC power in order to control water temperature in boiler 57. Bridge 96 replaces mechanical relay 19 (FIG. 1) of the prior art brewer, thus eliminating a typical mode of failure with the limited life for contacts 14, 16, 18 which often "pit" or "weld" shut when used with the high load currents required for the boiler heaters in this application.

The "on" state of bridge 96 is controlled with an appropriate signal to the low current gate of the SCR (Silicon Controlled Rectifier) that can be switched "on" or "off" with a plurality of long-life, optically-coupled solid state switches 98, or alternatively, a three-contact low current mechanical relay having a resistor and diode in series with each of the contacts. For purposes of the present invention, three solidstate switches 98 are represented, one going to each of the SCR gates, although any number may be employed. Either the mechanical or optical gate switches 98 provide the required isolation between signals of control board 51 and the AC power. The SCR's of bridge 96 turn off upon removal of the "On" signal from 98, and the voltage summation of the three phases reverse biases of the cathode to anode junction of the SCR's.

Turning now to FIG. 3, a side view of carafe 65 is shown having a lid 73 and the various regions for ultrasonic measurement of distances 66, 68, 70 and 72. FIGS. 4 and 5 show the top and bottom views of lid 73 respectively. However, not shown in these figures is the mounting structure that will cause lid 73 to cover or uncover carafe 65 as it is inserted or removed from the brewer pocket floor 67.

Lid 73 serves as a housing for transmitter 101 and receiver transducer 102, both of which are mounted directly to sensor subsystem 64. As mentioned before, lid 73 can effectively include a plurality of transducer/receiver combinations. Lid 73 may be of any size and have any dimensions, depending on the size of the opening in the container, so that a highly compact design is realized while still housing transmitter 101 and receiver 102. For example, at the range of 40 KHz, the transducers in lid 73 may be of ½ inch in diameter and at 250 KHz, the transducers can be about ⅜ inch in diameter or less. While lid 73 is a housing for the transducers and their processor, it also contains a brewed coffee catching region 104, where the brewed coffee will flow through a hole 106 in region 104, and then into carafe 65. Sensor subsystem 64 controls transmission of the sound pulse. Upon emission of a sound pulse, subsystem 64 begins a time measurement of the round-trip travel. Upon receipt of the return signal, sensor subsystem 64 records a value for actual distance traveled by the ultrasonic signal and instantly emits a signal to control board 51 to indicate which of the target ranges was recorded, i.e. whether empty level 66, second level 68, third level 70 or carafe full level 72 was recorded. Again, once the distance and time associated with an empty carafe 65 is detected at first level 66, boiler 57 is full of water, and the water temperature is below the predetermined low temperature threshold, the heating portion of the brew cycle may commence when the user depresses brew button 56.

During the course of the brew cycle, a second ultrasonic distance occurs when a predetermined amount of water has entered carafe 65 and water has reached second level 68. Once second level 68 is reached, warmer pad 86 is initiated so that an acceptable temperature for the brewed coffee is maintained. The distance/level measurement is repeated until third level 70 is reached. Upon reaching third level 70, the time associated with this signal is fed back to control board 51 as an indicator that water is entering carafe 65 at the proper rate. A final measurement occurs when carafe 65 is full at high level 72. Upon reaching high level 72, cold input valve 100 is closed and the brew cycle is terminated.

Figure 6:
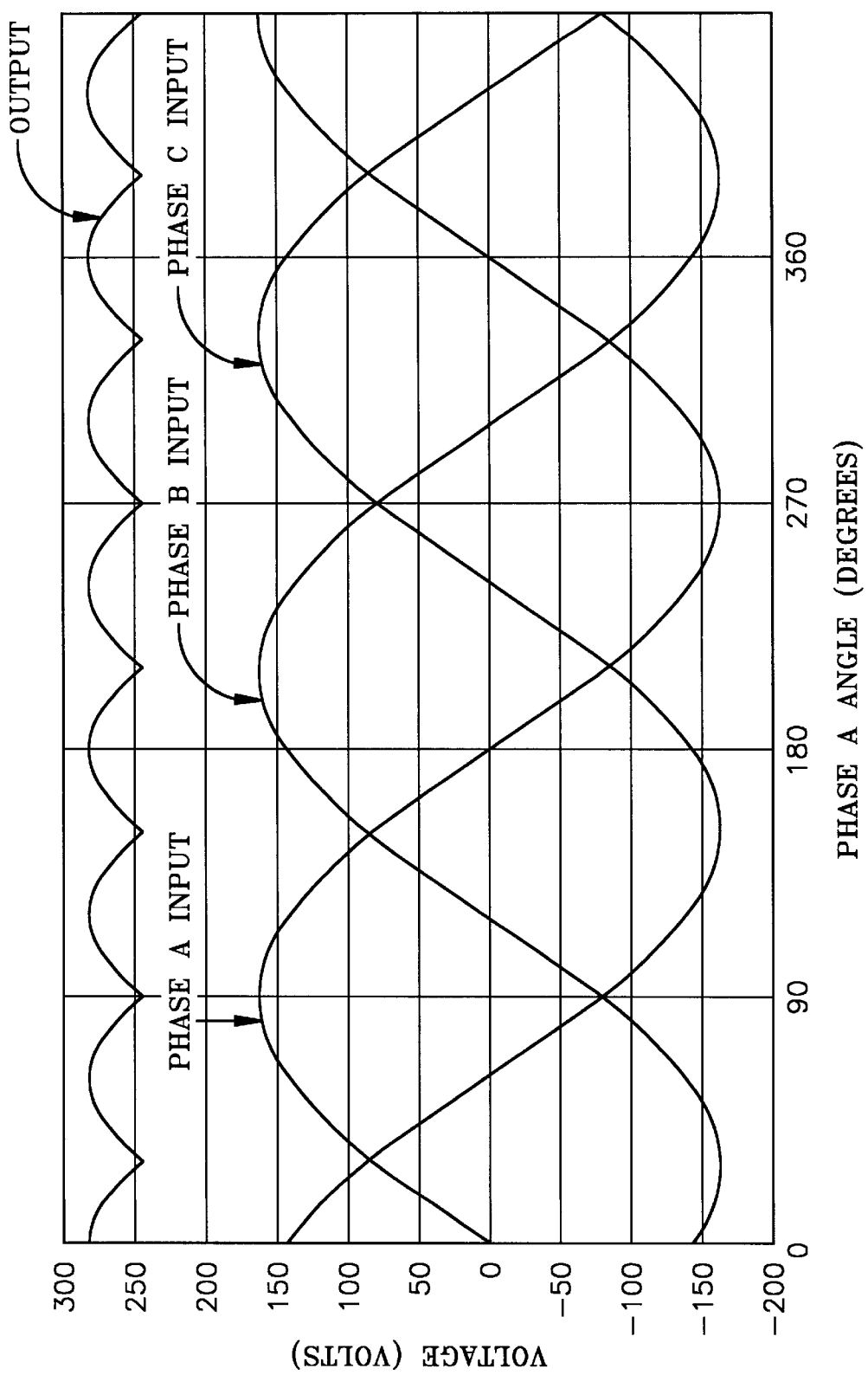
FIG. 6 is a graph showing the three-phase SCR/diode bridge input/output waveforms of the present invention.

Turning now to FIG. 6, a graph showing the three-phase SCR/diode bridge input/output waveforms is presented having the Phase angles for each of the phases on the x-axis and the voltages measured in volts on the y-axis. FIG. 6 shows how the three-phase AC input appears after having been rectified to DC power through the three-phase SCR/diode bridge 96. The DC output shown in FIG. 6 has the ability to deliver or remove power to heating element 84 when bridge 96 is switched to its "on" state, but has the added capability of independently controlling the on/off state to any one of the three phases to provide even greater flexibility in the power delivery stage of the brewer. If system 50 turn-off time is not fast enough, bridge 96 will enter into a "runaway" condition by re-conducting when the next cycle of AC is imposed on bridge 96, therefore, careful attention must be given to component selection in order to assure effective and safe operation with the more rapid transitions that exist in a 400 Hz (or greater) power system.

What has been described above are preferred aspects of the present invention. It is of course not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, combinations, modifications, and variations that fall within the spirit and scope of the appended claims.

What is claimed is:

1. An ultrasonic system for measuring the volume of a liquid in a container, comprising:
   a control board;
   a lid for the container; and
   an ultrasonic sensor subsystem that is electronically coupled to said control board and is located within and on the underside of said lid, said ultrasonic sensor subsystem being embedded within the underside of said lid, wherein said ultrasonic sensor subsystem is adapted to determine the level of liquid in the container, and said ultrasonic sensor subsystem comprises at least one ultrasonic pulse transducer for both transmitting and receiving ultrasonic signals while located within and on the underside of the lid of said system, said at least one transducer being embedded within and on the underside of said lid and emits ultrasonic pulses towards the liquid/air interface of an underlying liquid column housed in the container, and said ultrasonic pulse transducer located within and on the underside of the lid of said system receives said ultrasonic pulses reflected back to the lid to determine the level of liquid in the container.

2. A system according to claim 1 and further including a boiler for heating the liquid.

3. A system according to claim 2 and further including a first boiler sensor for detecting the presence of liquid inside the boiler.

4. A system according to claim 2 and further including a second boiler sensor for gauging the temperature of the liquid contained in the boiler.

5. A system according to claim 2 and further including a first boiler sensor for detecting the presence of liquid inside the boiler and a second boiler sensor for gauging the temperature of the liquid contained in the boiler.

6. A system according to claim 2 and further including a single heating element electronically coupled to said boiler for heating the liquid inside said boiler to a desired temperature.

7. A system according to claim 6 wherein said heating element is turned on once the liquid reaches a predetermined low temperature and is turned off once the liquid reaches a predetermined high temperature.

8. A system according to claim 6 wherein said heating element operates on DC power.

9. A system according to claim 6 wherein said heating element is controlled by a solid A state, three-phase SCRl-diode bridge, said bridge converting a three-phase alternating current (AC) power to a direct current (DC) power.

10. A system according to claim 1 and further including a heating element beneath said container and a processor for processing liquid in the container, and control circuitry for causing said heating element to maintain the processed liquid at an elevated temperature, wherein said heating element is electronically coupled to a single phase of said three-phase alternating current and said heating element being controlled by a semiconductor triac which is able to conduct both the positive and negative regions of the AC current while said system is being operated.

11. A system according to claim 1 wherein said ultrasonic sensor subsystem is further adapted to detect the presence of said container in a brewer pocket and upon detection of said container providing an enabling signal to said system controller.

12. A system according to claim 1 wherein said ultrasonic sensor subsystem is adapted to calculate the exact level of the liquid contained in the underlying liquid container by transmitting and receiving ultrasonic pulses, processing the receiving of said ultrasonic pulses and calculating the roundtrip time traveled by said ultrasonic pulses.

13. A system according to claim 12 wherein the lengths of the ultrasonic pulses emitted by said ultrasonic pulse transmitter are less than the shortest roundtrip time traveled by said ultrasonic pulses.

14. A system according to claim 13 wherein said ultrasonic sensor subsystem determines the distance traveled by the ultrasonic pulses by calculating the roundtrip time traveled by the ultrasonic pulses and by applying the speed of sound in air to the distance traveled by the ultrasonic pulses.

15. A system according to claim 1 wherein said lid further includes a heated liquid catching region and a hole in said region whereby said heated liquid collects in said region and flows through said hole to a container.

16. A system according to claim 10 wherein said liquid is water that is brewed into coffee, said processor is a coffee brewer, and said container is a brewed coffee carafe.

17. A system according to claim 1 wherein said lid is removably coupled to said system.

18. A system according to claim 17 wherein said lid serves as a housing for all components of said system.

19. A system according to claim 18 wherein said components include said ultrasonic pulse transmitter and said ultrasonic pulse receiver which are mounted directly onto said sensor subsystem.

20. A system according to claim 1 further comprising a maintenance device having memory circuitry for storing data and measured results and for providing electronic signals for a predetermined maintenance schedule for said system, and a display device for indicating the generation of the electronic maintenance signals.

21. A system according to claim 1 wherein the control board includes a keyboard with actuators manually operable for controlling at least part of the operation system, said manual actuators control the initiation of a brewing cycle, control the introduction of hot and cold water into said system, and turn the brewer on and off.

22. An ultrasonic system for measuring the volume of brewed coffee in an airline coffee brewer, comprising:
   a lid for the brewer;
   if a control board;
   an ultrasonic sensor subsystem electronically coupled to said control board and located on the underside of the lid of said system wherein said subsystem is adapted to emit and receive ultrasonic signals and is able to process said signals to determine the exact level of brewed coffee present in an underlying carafe; and
   a single heating element for warming the water to be brewed into coffee and for maintaining the water to be brewed into coffee at a relatively constant temperature, said heating element controlled by a three phase SCR/diode bridge that converts the alternating current of an aircraft into direct current power.

23. A three phase SCR/diode-bridge for converting an alternating current of an aircraft power system into a direct current power for powering a single heating element in a boiler of an aircraft brewing system.

24. The three phase SCR/diode bridge of claim 23 wherein said alternating current is 400 Hz.

25. An ultrasonic system for measuring the volume of a liquid in a container, comprising:
   a control board;
   a lid for the container;
   an ultrasonic sensor subsystem that is electronically coupled to said control board and is located within and on the underside of said lid, wherein said ultrasonic sensor subsystem is adapted to determine the level of liquid in the container, and said ultrasonic sensor subsystem comprises at least one ultrasonic pulse transducer for both transmitting and receiving ultrasonic signals while located within and on the underside of the lid of said system, said at least one transducer emits ultrasonic pulses towards the liquid/air interface of an underlying liquid column housed in the container, and said ultrasonic pulse transducer located within and on the underside of the lid of said system receives said ultrasonic pulses reflected back to the lid to determine the level of liquid in the container; and
   a boiler for heating the liquid.

26. A system according to claim 25 and further including a first boiler sensor for detecting the presence of liquid inside the boiler.

27. A system according to claim 25 and further including a second boiler sensor for gauging the temperature of the liquid contained in the boiler.

28. A system according to claim 25 and further including a single heating element electronically coupled to said boiler for heating the liquid inside said boiler to a desired temperature.

29. A system according to claim 28 wherein said heating element is turned on once the liquid reaches a predetermined low temperature and is turned off once the liquid reaches a predetermined high temperature.

30. A system according to claim 28 wherein said heating element operates on DC power.

31. A system according to claim 28 wherein said heating element is controlled by a solid state, three-phase SCR/diode bridge, said bridge converting a three-phase alternating current (AC) power to a direct current (DC) power.

32. A system according to claim 25 and further including a heating element beneath said container and a processor for processing liquid in the container, and control circuitry for causing said heating element to maintain the processed liquid at an elevated temperature, wherein said heating element is electronically coupled to a single phase of said three-phase alternating current and said heating element being controlled by a semiconductor triac which is able to conduct both the positive and negative regions of the AC current while said system is being operated.

33. A system according to claim 25 wherein said ultrasonic sensor subsystem is further adapted to detect the presence of said container in a brewer pocket and upon detection of said container providing an enabling signal to said system controller.

34. A system according to claim 25 wherein said lid further includes a heated liquid catching region and a hole in said region whereby said heated liquid collects in said region and flows through said hole to a container.

35. A system according to claim 32 wherein said liquid is water that is brewed into coffee, said processor is a coffee brewer, and said container is a brewed coffee carafe.

36. A system according to claim 25 and further comprising a maintenance device having memory circuitry for storing data and measured results and for providing electronic signals for a predetermined maintenance schedule for said system, and a display device for indicating the generation of the electronic maintenance signals.

37. A system according to claim 25, wherein the control board includes a keyboard with actuators manually operable for controlling at least part of the operation system, said manual actuators control the initiation of a brewing cycle, control the introduction of hot and cold water into said system, and turn the brewer on and off.

38. An ultrasonic system for measuring the volume of a liquid in a container, comprising:

a control board;

a lid for the container;

an ultrasonic sensor subsystem that is electronically coupled to said control board and is located within and on the underside of said lid, wherein said ultrasonic sensor subsystem is adapted to determine the exact level of liquid in the container by transmitting and receiving ultrasonic pulses, processing the receiving of said ultrasonic pulses and calculating the roundtrip time traveled by said ultrasonic pulses, and wherein said ultrasonic sensor subsystem comprises at least one ultrasonic pulse transducer for both transmitting and receiving ultrasonic signals while located within and on the underside of the lid of said system, said at least one transducer emits ultrasonic pulses towards the liquid/air interface of an underlying liquid column housed in the container, and said ultrasonic pulse transducer located within and on the underside of the lid of said system receives said ultrasonic pulses reflected back to the lid to determine the level of liquid in the container; and a boiler for heating the liquid.

39. A system according to claim 38 wherein the lengths of the ultrasonic pulses emitted by said ultrasonic pulse transmitter are less than the shortest roundtrip time traveled by said ultrasonic pulses.

40. A system according to claim 39 wherein said ultrasonic sensor subsystem determines the distance traveled by the ultrasonic pulses by calculating the roundtrip time traveled by the ultrasonic pulses and by applying the speed of sound in air to the distance traveled by the ultrasonic pulses.

41. An ultrasonic system for measuring the volume of a liquid in a container, comprising:

a control board;

a lid for the container, said lid being removable coupled to said system;

an ultrasonic sensor subsystem that is electronically coupled to said control board and is located within and on the underside of said lid, wherein said ultrasonic sensor subsystem is adapted to determine the exact level of liquid in the container, and wherein said ultrasonic sensor subsystem comprises at least one ultrasonic pulse transducer for both transmitting and receiving ultrasonic signals while located within and on the underside of the lid of said system, said at least one transducer emits ultrasonic pulses towards the liquid/air interface of an underlying liquid column housed in the container, and said ultrasonic pulse transducer located within and on the underside of the lid of said system receives said ultrasonic pulses reflected back to the lid to determine the level of liquid in the container; and a boiler for heating the liquid.

42. A system according to claim 41 wherein said lid serves as a housing for all components of said system.

43. A system according to claim 42 wherein said components include said ultrasonic pulse transmitter and said ultrasonic pulse receiver, which are mounted directly onto said sensor subsystem.

* * * * *